US012751526B2

(12) United States Patent
Bouchet

(10) Patent No.: US 12,751,526 B2
(45) Date of Patent: Oct. 6, 2026

(54) FASTENING MEMBER FOR ATTACHING A BRACELET TO A WATCH CASE

(71) Applicant: Manufacture d'Horlogerie Audemars Piguet SA, Le Brassus (CH)

(72) Inventor: Aurélien Bouchet, Gilley (FR)

(73) Assignee: Manufacture d'Horlogerie Audemars Piguet SA, Le Brassus (CH)

( * ) Notice: Subject to any disclaimer, the term of this patent is extended or adjusted under 35 U.S.C. 154(b) by 212 days.

(21) Appl. No.: 18/843,385

(22) PCT Filed: Mar. 2, 2023

(86) PCT No.: PCT/IB2023/051935
§ 371 (c)(1),
(2) Date: Sep. 3, 2024

(87) PCT Pub. No.: WO2023/166452
PCT Pub. Date: Sep. 7, 2023

(65) Prior Publication Data
US 2025/0185765 A1 Jun. 12, 2025

(30) Foreign Application Priority Data
Mar. 3, 2022 (EP) .................................... 22159921

(51) Int. Cl.
*G04B 37/14* (2006.01)
*A44C 5/14* (2006.01)

(52) U.S. Cl.
CPC .......... *A44C 5/147* (2013.01); *G04B 37/1486* (2013.01)

(58) Field of Classification Search
CPC .. G04B 37/1486; G04B 37/148; A44C 5/147; A44C 5/14
See application file for complete search history.

(56) References Cited

U.S. PATENT DOCUMENTS 2,034,128 A * 3/1936 Boucher .................. A44C 1/00 63/1.17
3,908,243 A * 9/1975 Lou ...................... A44C 5/2061 24/653

(Continued)

FOREIGN PATENT DOCUMENTS

CH 698584 B1 9/2009
CH 707056 A2 4/2014

(Continued)

OTHER PUBLICATIONS

International Search Report and Written Opinion received for PCT Patent Application No. PCT/IB2023/051935, mailed on Jun. 16, 2023, 10 Pages.

(Continued)

*Primary Examiner* — Sean Kayes
(74) *Attorney, Agent, or Firm* — BLANK ROME LLP

(57) ABSTRACT

The present invention concerns a fastening member for a strand of a bracelet, adapted to be removably connected to a watch case. The fastening member has a housing in which are held a first and a second pad arranged so as to be able to slide in a direction transverse to the length of the strand and to cooperate respectively with a first and a second pivot secured to the lugs of the watch case; an elastic member arranged so as to move the first and second pads away from each other; and a lock arranged, on the one hand, to lock the fastening member when the lock is in a locked position and, on the other hand, to allow the fastening member to be disconnected from the watch case when the lock is actuated to be brought into an unlocked position and a force allowing the fastening member to be separated from the watch case is applied against the elastic member. According to the invention, the lock and the first and second pads are configured so that the actuation of the lock from the locked position to the (Continued)

unlocked position does not transmit any movement to said first and second pads.

14 Claims, 5 Drawing Sheets

(56) References Cited

U.S. PATENT DOCUMENTS

| | | | | |
|---|---|---|---|---|
| 4,914,790 | A * | 4/1990 | Foubert | A44C 5/18 24/616 |
| 6,014,793 | A | 1/2000 | Howald | |
| 6,023,816 | A * | 2/2000 | Okada | A44C 5/24 24/71 J |
| 6,408,491 | B2 * | 6/2002 | Guyard | G04B 37/1486 368/282 |
| 7,380,979 | B2 * | 6/2008 | Hiranuma | A44C 5/14 368/282 |
| 2001/0016971 | A1 * | 8/2001 | Guyard | G04B 37/1486 24/365 |

FOREIGN PATENT DOCUMENTS

| | | | |
|---|---|---|---|
| CH | 712656 | B1 | 9/2020 |
| CN | 215685297 | U | 2/2022 |
| EP | 2353428 | B1 | 2/2016 |
| EP | 3213654 | A1 | 9/2017 |
| EP | 3 510 888 | A1 | 7/2019 |
| JP | 58080018 | U | 9/1928 |
| JP | 2000505664 | A | 5/2000 |
| JP | 2007090033 | A | 4/2007 |

OTHER PUBLICATIONS

Decision of Grant for Japanese Application No. 2024-547646, 1 page.

* cited by examiner

A-A

B-B

C-C

D-D

FASTENING MEMBER FOR ATTACHING A BRACELET TO A WATCH CASE

CROSS-REFERENCE TO RELATED APPLICATIONS

This application is a National Phase entry of International Application Ser. No. PCT/IB2023/051935, filed on Mar. 2, 2023, which claims the benefit of priority of European Patent Application Ser. No. 22159921.0, filed on Mar. 3, 2022. The entire content of these applications is hereby incorporated by reference.

TECHNICAL FIELD

The present invention relates to a fastening member for attaching a strand of a bracelet to a watchcase. More particularly, the fastening member comprises an insert or frame arranged to be inserted and removably connected between the lugs of the watch case.

STATE OF THE ART

Numerous solutions have already been proposed in the prior art to simplify the removal or fitting of bracelets on watch cases to avoid having to use a specific tool. This allows the user of the watch to be able, for example, to change the style or color of the bracelet as he wishes, without complicated handling and without the risk of damaging or scratching the watch through the careless use of a tool.

By way of example, CH707056 discloses an interchangeable bracelet for a wristwatch, comprising a fastening member at one end of each strand for removable connection to a watch case. The fastening member comprises a cylindrical housing intended to cooperate with a fastening barrette to fasten the bracelet to the case. This housing has an opening along its longitudinal direction, forming a passage to allow insertion of the barrette. The fastening member further comprises a lock mounted so as to be movable between a first position in which the passage is free and a second position in which the bolt obstructs the passage in order to lock the bracelet to the watch case.

Other examples can be found, in particular in publications CH712656B1, EP2353428B1, EP3213654A1 and CH698584B1, of a fastening member intended to simplify the removal/fitting of bracelet strands on a watch case.

These fastening members have the disadvantage of requiring modifications to be made to the watch case so that the latter is adapted to cooperate with the fastening member, in particular for the integration of a push-button enabling the fastening member to be unlocked from the watch case.

An aim of the present invention is therefore to provide a fastening member enabling a strand of a bracelet to be connected to a watch case in a removable manner without having to modify the watch case for this purpose.

Another aim of the present invention is to provide a fastening member that takes up little space and does not require the use of a barrette to make the link between one strand of the bracelet and the lugs of the watch case.

BRIEF SUMMARY OF THE INVENTION

These aims are achieved in particular by a fastening member for a strand of a bracelet, adapted to be removably connected to a watch case. The fastening member comprises: a housing in which are held a first and a second pad arranged so as to be able to slide in a direction transverse to the length of the strand and to cooperate respectively with a first and a second pivot secured to the lugs of the watch case; an elastic member arranged so as to move the first and second pads away from each other; and a lock arranged, on the one hand, to lock the fastening member when the lock is in a locked position and, on the other hand, to allow the fastening member to be disconnected from the watch case when the lock is actuated to be brought into an unlocked position and a force allowing the fastening member to be separated from the watch case is applied against the elastic member. According to the invention, the lock and the first and second pads are configured so that the actuation of the lock from the locked position to the unlocked position does not transmit any movement to the first and second pads.

In an embodiment, the lock comprises a body including a first portion accessible by the user and a second portion for blocking the displacement of the first and second pads when the lock is in the locked position.

In an embodiment, the lock is arranged to be returned to the locked position by an elastic member.

In an embodiment, the lock comprises a recess, preferably cylindrical, inside which the elastic member, preferably a compression spring, is arranged in order to urge the lock into the locked position.

In an embodiment, the fastening member further comprises a cover mounted on the housing. One end of the elastic member bears against the cover.

In an embodiment, the second portion of the body comprises a stop which prevents the pads from moving towards each other when the lock is in the locked position.

In an embodiment, the second portion comprises a notch which extends in a plane intercepting the direction of displacement of the lock. Part of each pad is configured to slide in the notch when the lock is in the unlocked position.

In an embodiment, the fastening member comprises two side walls and a receiving part arranged on each side wall to receive the first and second pivots. The receiving parts are shaped to limit the disconnection to a relative movement exerted in a predefined direction.

In an embodiment, each receiving part is arranged to receive one of the first and second pivots from an entry to an exit opening into the housing.

In an embodiment, each pad has a first lateral side arranged opposite a corresponding side edge of the housing. This first lateral side comprises a hole arranged to receive one end of the corresponding pivot when the fastening member is connected to the watch case.

In an embodiment, the first lateral side of each pad further comprises a guiding surface leading to the hole. The guiding surface is profiled to induce a transverse displacement of each pad as the end of the corresponding pivot moves along the guiding surface.

Another aspect of the invention relates to a strand of a watch bracelet comprising the fastening member.

Another aspect of the invention relates to a wristwatch comprising at least one strand of a bracelet comprising the fastening member.

An additional aspect of the invention relates to a method of disconnecting the fastening member, comprising:

- actuating the lock to bring it into the unlocked position, and applying a force to separate the fastening member from the watch case, while maintaining the lock in the unlocked position.

BRIEF DESCRIPTION OF THE FIGURES

Examples of embodiments of the invention are shown in the description illustrated by the appended figures in which.

EXAMPLES OF EMBODIMENTS OF THE INVENTION

Figure 1:
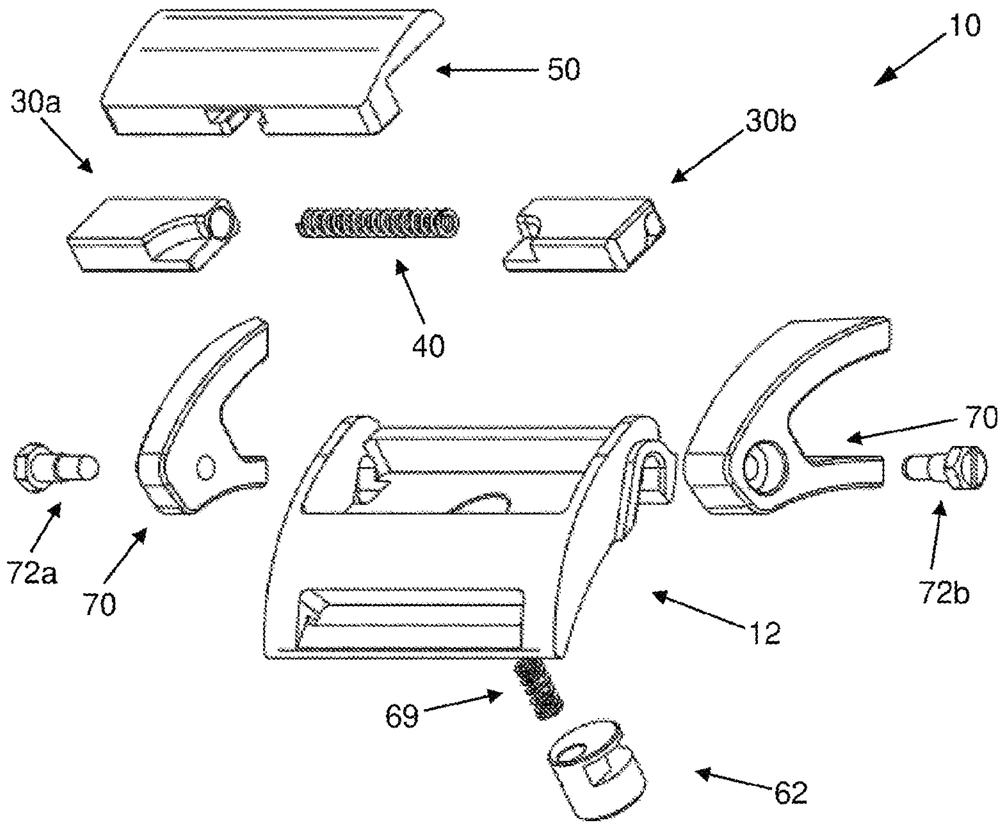
FIG. 1 shows an exploded view of the fastening member according to a preferred embodiment.
Figure 2:
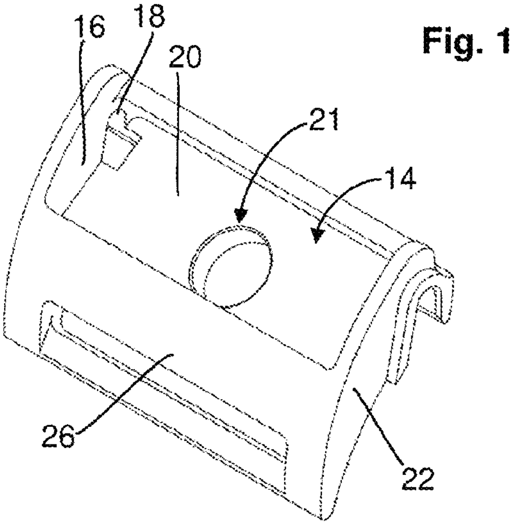
FIG. 2 shows a perspective view from the top of the frame of the fastening member.
Figure 3:
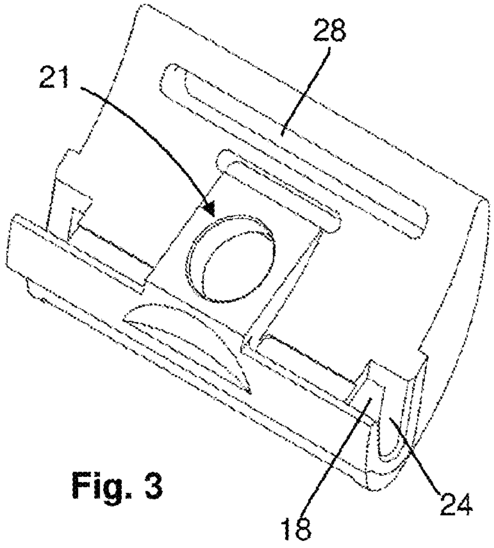
FIG. 3 shows a perspective view from below of the frame of the fastening member.
Figure 4:
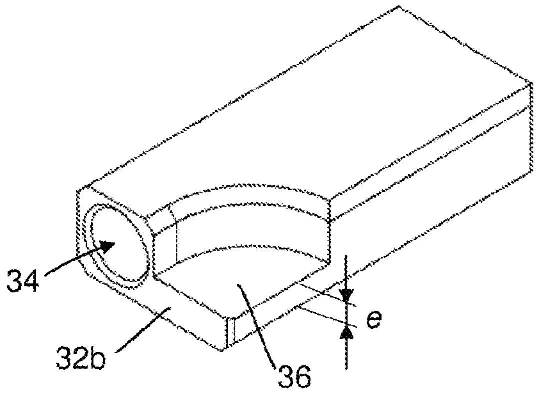
FIG. 4 shows a perspective view of a pad of the locking/unlocking mechanism.
Figure 5:
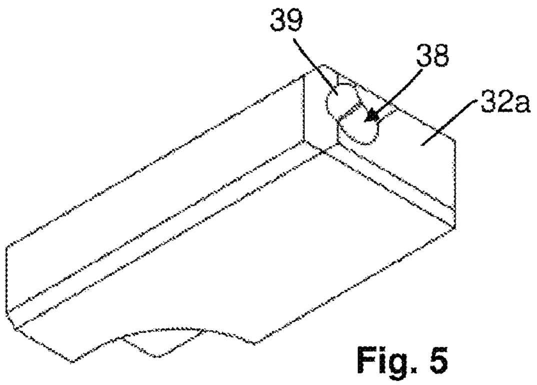
FIG. 5 shows a perspective view of the pad of FIG. 4 in a different orientation.

According to a preferred embodiment and with reference in particular to FIGS. 1 to 3, the fastening member 10, for attaching a bracelet strand to a watch case, comprises a frame 12 having a substantially rectangular housing 14 intended to accommodate elements of a locking/unlocking mechanism. This mechanism is designed to connect and disconnect the frame 12 to two pivots 72*a*, 72*b*, for example two screws, mounted on the lugs 70 of the watch case (only the lugs are illustrated). The fastening member 10 further comprises a cover 50 mounted on the frame 12 so as to cover the housing 14 comprising the elements of the locking/unlocking mechanism. A lower part of the cover 50 can, for example, be driven, clipped or screwed into the housing 14.

The housing 14 of the frame 12 comprises two opposite side edges 16 each comprising an opening 18. These openings open onto a first and a second receiving part 24 respectively, arranged on the side walls 22 of the frame 12 to receive the two pivots 77*a*, 77*b*. The first and second receiving parts may, for example, be in the form of rails. These rails 24 are preferably shaped so that a portion of the two pivots 72*a*, 72*b* can be introduced into the rails by positioning the fastening member 10 above the horns 70 of the watch case, then by lowering the fastening member 10 relative to the horns until the bottom of the rails rests on the pivots. The fastening member 10 can thus pivot freely about a pivot axis that is coaxial with the axis of the pivots when this fastening member 10 is locked to the watch case.

According to FIGS. 2 and 3, the bottom 20 of the housing 14 comprises a through-hole 21 in the frame 12 of the fastening member. The locking/unlocking mechanism, for attaching the fastening member to the watch case, comprises a lock 60 which is mounted in the through-hole 21 so as to be operable in an oblique direction, preferably substantially orthogonal, to the pivot axis of the fastening member 10. The fastening member 10 comprises a fastening part 26 provided with a transverse slot 28 for receiving one end of a strand of the bracelet.

With reference in particular to FIGS. 1 to 5, the locking/unlocking mechanism further comprises a first and a second pad 30*a*, 30*b* arranged in the housing 14 so as to be able to slide in a direction transverse to the length of the strand of the bracelet and to cooperate respectively with the first and second pivot 72*a*, 72*b* through the openings 18 located on the two side edges 16 of the housing 14.

Each pad 30*a*, 30*b* comprises a first lateral side 32*a* arranged opposite the corresponding side edge 16 of the housing 14. The first lateral side 32*a* of each pad comprises a hole 38 arranged to receive an end of the corresponding pivot 72*a*, 72*b*, when the fastening member 10 is connected to the watch case. The first lateral side 32*a* of each pad also comprises a guiding surface 39 leading to the hole 38. The profile of the guiding surface 39 enables to initiate and impart a transverse displacement to the respective pad when the end of the corresponding pivot moves along this surface.

Each pad 30*a*, 30*b* comprises a second lateral side 32*b*. The second lateral sides of the pads are arranged opposite one another and each comprises a blind hole 34.

Each blind hole 34 receives a portion of an elastic member, preferably a compression spring 30, arranged between the two pads.

The lock 60 is arranged, on the one hand, to lock the fastening member 10 when the lock 60 is in a locked position and, on the other hand, to allow the fastening member 10 to be disconnected from the watch case when the lock 60 is actuated to be brought into an unlocked position. The particularity of the locking/unlocking mechanism lies partly in the fact that the lock 60 and the first and second pads 30*a*, 30*b* are configured so that actuation of the lock 60 to bring it into the unlocked position does not transmit any movement to the first and second pads 30*a*, 30*b*. In other words, the lock 60 enables the transverse displacements of the first and second retractable pads to be locked and unlocked without acting on them.

Figure 6:
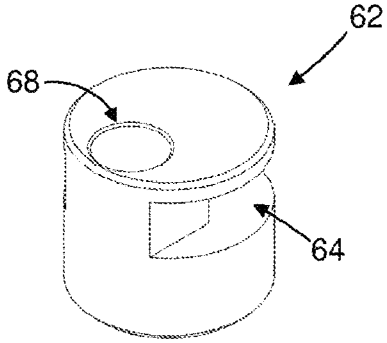
FIG. 6 shows a perspective view of the lock body of the locking/unlocking mechanism.
Figure 7:
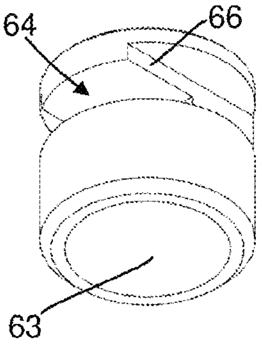
FIG. 7 shows a perspective view of the lock body of FIG. 6 in a different orientation.
Figure 8:
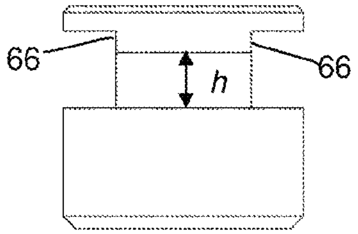
FIG. 8 shows an elevation view of the lock body.
Figure 13:
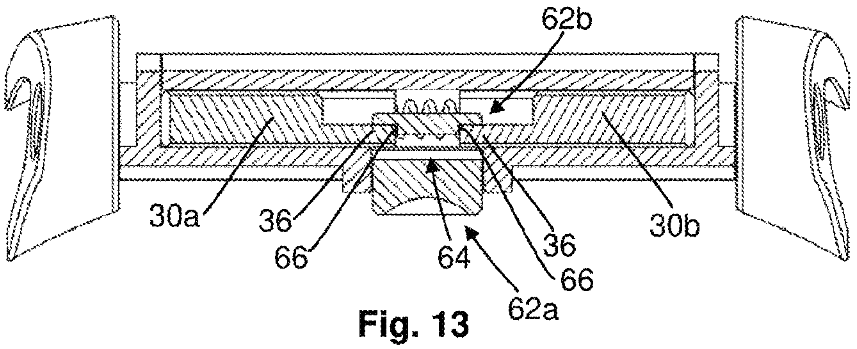
FIG. 13 shows a cross-sectional view of FIG. 12 along B-B.

To this end, according to FIGS. 6-8, the lock comprises a body 62 comprising a first portion 62*a* accessible by a user and a second portion 62*b* arranged inside the housing 14 in order to block the displacement of the first and second pads 30*a*, 30*b* when the lock 60 is in the locked position as illustrated in FIG. 13.

In an embodiment, the second portion 62*a* of the body of the lock 60 comprises a notch 64 extending in a direction perpendicular to the direction of displacement of the lock 60. Each pad 30*a*, 30*b* comprises a corner 36 arranged to abut respectively a first and a second shoulder 66 of the body 62 when the lock 60 is in the locked position. The two shoulders 66 are arranged on either side of the notch 64 above it. The corner 36 of each pad is aligned with the notch 64 when the lock 60 is in the unlocked position. The thickness e of the corner 36 of each pad 30*a*, 30*b* is less than the height h of the notch 64 of the lock body so that the corners can slide inside the notch.

Figure 9:
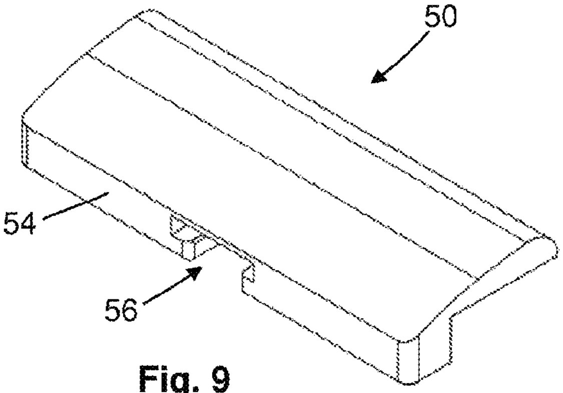
FIG. 9 shows a perspective view from the top of the cover of the fastening member.
Figure 10:
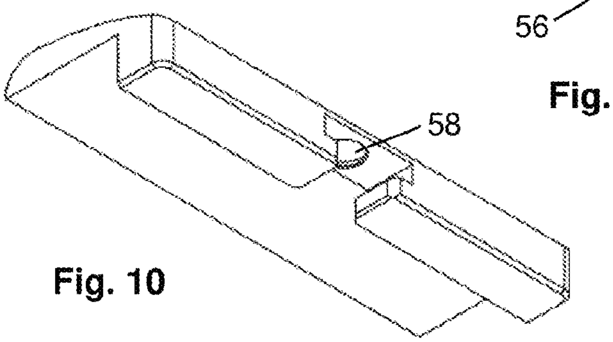
FIG. 10 shows a perspective view from below of the cover of FIG. 9.

The body 62 of the lock 60 further comprises a housing 68, which in this example is cylindrical, inside which an elastic member is partially disposed, preferably in the form of a compression spring 69. One end of the spring 69 rests against the bottom of the housing 68, while a portion of the spring is housed in a cut-out 56 made on a longitudinal edge 54 of the cover 50, as shown in FIGS. 9 and 10. This cut-out has a cylindrical recess 58 designed to receive the other end of the spring 69.

This spring enables to urge the lock 60 into the locked position in which the fastening member 10 is secured to the watch case.

Figure 11:
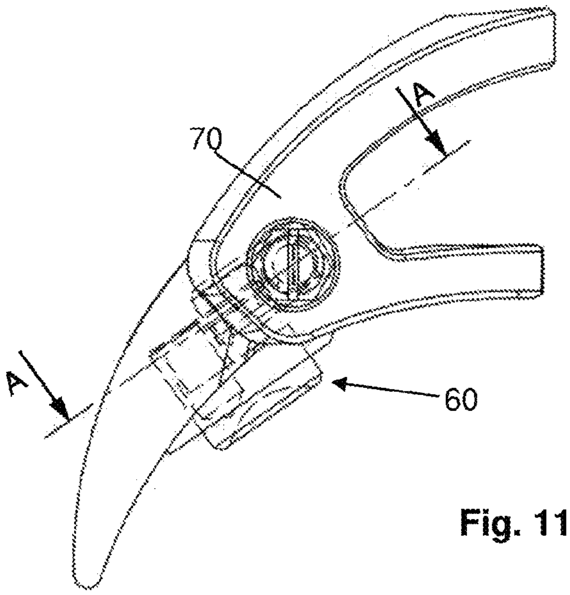
FIG. 11 shows a side view of the fastening member connected to a watch case, of which only the lugs are shown, when the lock is in the locked position.
Figure 12:
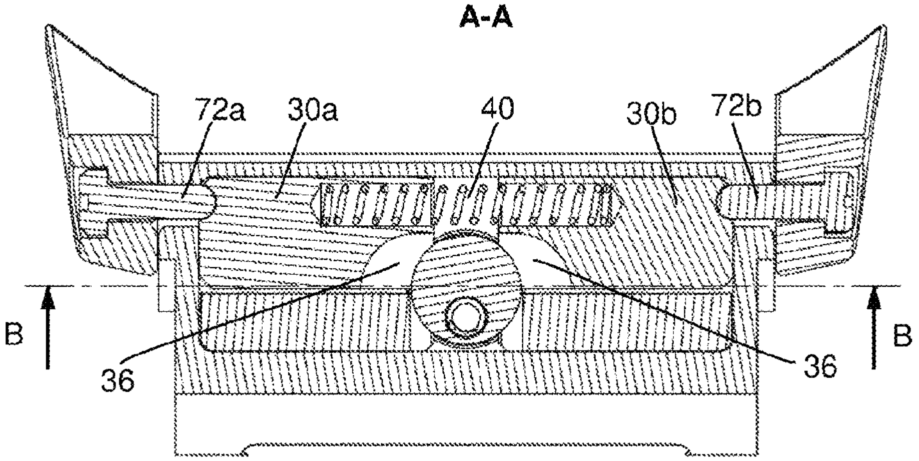
FIG. 12 shows a cross-sectional view of FIG. 11 along A-A.

When the lock 60 is in the locked position according to FIGS. 11 to 13, the corners of each pad 30*a*, 30*b* are in abutment against the two shoulders 66 of the body 62 of the lock in order to prevent any transverse displacement of the pads. In this position, the end of each pivot 72*a*, 72*b* is arranged inside the hole 38 of the first lateral side 32*a* of each pad. As the transverse displacement of the pads 30*a*, 30*b* is prevented by the lock 60, the fastening member 10 is in this configuration secured to the lugs 70 of the watch case.

Figure 14:
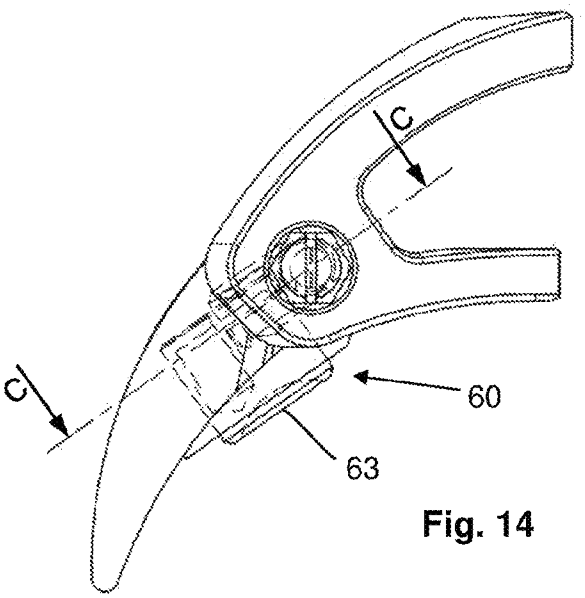
FIG. 14 shows a view similar to FIG. 11 when the lock is in the unlocked position.
Figure 15:
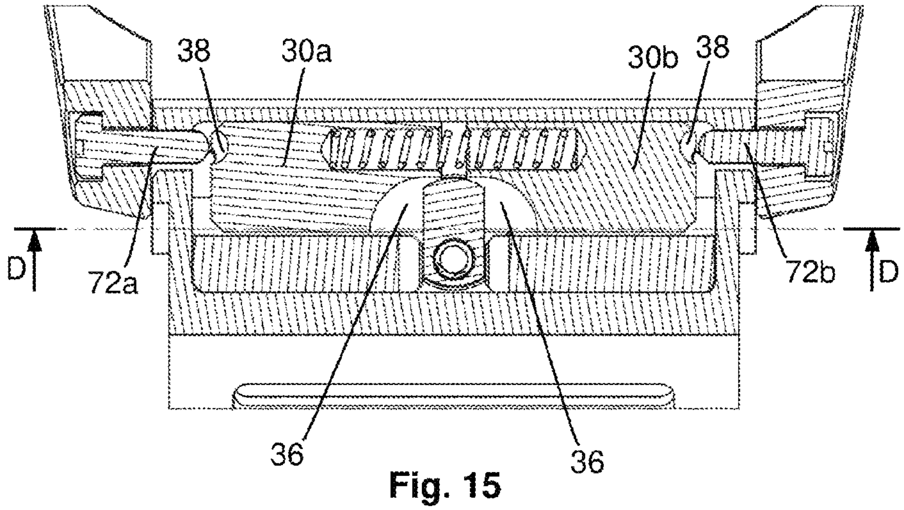
FIG. 15 shows a cross-sectional view of FIG. 14 along C-C.
Figure 16:
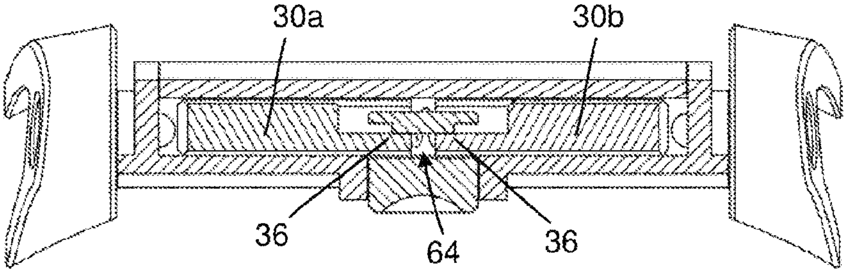
FIG. 16 shows a cross-sectional view of FIG. 15 along D-D.

When pressure is exerted on an actuating surface 63 of the lock 60, the latter moves in a direction perpendicular to the axis of the pivots to be brought into the unlocked position as shown in FIGS. 14 to 16. Actuation of the lock 60 does not transmit any movement to the two pads 30*a*, 30*b* when it is brought into the unlocked position. However, the notch 64 in the body 62 of the lock is aligned with the corners of each pad.

This alignment enables the two pads 30*a*, 30*b* to slide inside the notch 64 under the action of the force exerted by the end of the pivots 72*a*, 72*b* on the pads when a relative movement is imparted between the fastening member and the watch case. In the illustrated embodiment, the fastening member 10 must be moved above the watch case in a direction dictated by the inclination of the rails 24 in order to disconnect the fastening member from the watch case.

The movement of the fastening member 10 relative to the watch case makes it possible to dislodge from the respective holes 38 the ends of the pivots 72*a*, 72*b* under the stress exerted by the latter on the respective pads 30*a*, 30*b*, which causes the corner 36 of each pad 30*a*, 30*b* to move into the notch 64 (FIG. 16). The transverse displacement of the two pads in an opposite direction compresses the compression spring 40 as shown in FIG. 15. According to this figure, the pivots 72*a*, 72*b* are facing the rails, which allows the fastening member to be disconnected.

Once the fastening member is disconnected from the watch case, the two pads 30*a*, 30*b* are disengaged from the notch 64 of the lock body under the action of the compression spring 40. The lock 60 returns to the locked position under the action of the compression spring 69 as soon as the lock is released.

In order to secure the fastening member to the watch case, the two pivots 72*a*, 72*b* secured to the lugs 70 of the watch case are arranged in the rails 24 of the fastening member, then a pressure is exerted on the actuating surface 63 of the lock 60 while moving the fastening member relative to the watch case in order to move the pivots 72*a*, 72*b* in the respective rails until the ends of the pivots exert a stress on the guiding surfaces 39 to induce a transverse displacement of the two pads 30*a*, 30*b* in an opposite direction thereby compressing the compression spring 40.

When the ends of the pivots 72*a*, 72*b* are aligned with the respective holes 38 in the two pads 30*a*, 30*b*, the latter return to their initial position under the action of the compression spring 40. The lock 60 can at this point be released so that it returns to the locked position under the action of the compression spring 69 of the lock in order to lock the fastening member to the watch case.

Figure 17:
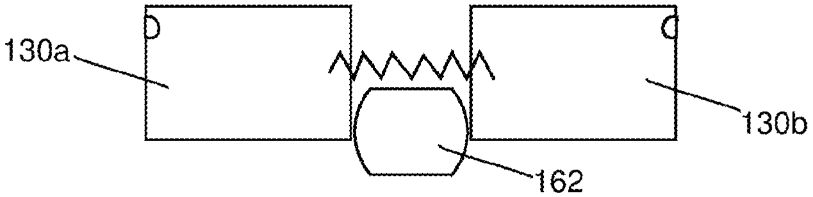
FIG. 17 shows a schematic view of the lock and the pads of the fastening member according to a variant, when the lock is in a locked position.
Figure 18:
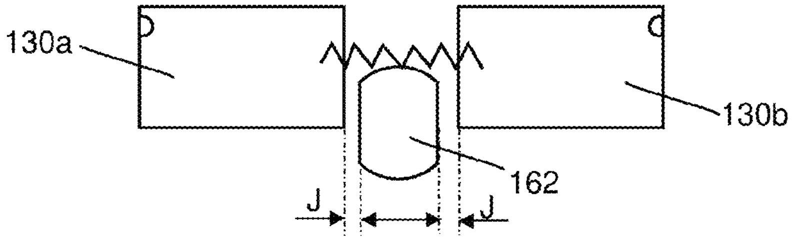
FIG. 18 shows a view similar to FIG. 17 when the lock of the fastening member is in an unlocked position.

According to another embodiment, illustrated by FIGS. 17 and 18, instead of being actuated in translation, the lock is adapted to be actuated in rotation between two angular positions corresponding respectively to a locked position and to an unlocked position. To this end, the lock comprises an eccentric lock body 162 having a first width, in a first direction, which is greater than a second width in a direction orthogonal to the first direction.

According to FIG. 17, the angular position of the lock 162 corresponds to the locked position. The lock body 162 is oriented so that the first width of the lock body 162 is arranged in the direction of displacement of the first and second pads 130*a*, 130*b* so that the latter abut against the lock body 162.

To move the lock from the locked position to the unlocked position, the lock is rotated through 90° so that the second width of the lock body 162 is arranged in the direction of displacement of the first and second pads 130*a*, 130*b* as illustrated in FIG. 18. In the unlocked position, there is therefore play J between the lock body 162 and the respective pads 130*a*, 130*b*, which allows the two pads 130*a*, 130*b* to slide under the action of the force exerted by the end of the pivots on the pads when a relative movement is imparted between the fastening member and the watch case. The fastening member may also comprise a torsion spring (not illustrated) in order to urge the lock into the locked position. The lock body 162 can of course be shaped in different ways in order to lock and unlock the sliding of the two pads 130*a*, 130*b* according to the angular position of the body.

It is understood that various modifications may be made to the fastening member without departing from the invention as defined in the appended claims. In particular, the shape of the pads and of the lock body may vary insofar as the actuation of the lock from the locked position to the unlocked position does not transmit any movement to the locking mechanism, and in particular no movement to the first and second pads.

LIST OF REFERENCES

- Fastening member 10
  - Frame 12
    - Housing 14
      - Side edges 16
      - Opening 18
      - Bottom 20
        - Through-hole 21
    - Side walls 22
      - Receiving part 24
    - Fastening part 26
    - Transverse slot 28
  - First and second pads 30*a*, 30*b*, 130*a*, 130*b*
    - First lateral side 32*a*
      - Hole 38
      - Guiding surface 39
    - Second lateral side 32*b*
      - Blind hole 34
      - Corner 36
        - Thickness e
  - Elastic member 40
  - Cover 50
    - Longitudinal edge 54
      - Cut-out 56
        - Cylindrical recess 58

Lock 60
Body 62, 162
First portion 62*a*
Actuating surface 63
Second portion 62*b*
Notch 64
Height h
Shoulders 66
Housing 68
Elastic member 69
Lugs 70
Pivot 72*a*, 72*b*

The invention claimed is:

1. A fastening member for a strand of a bracelet, adapted to be removably connected to a watch case, the fastening member comprising:

a housing in which are held a first and a second pad arranged so as to be able to slide in a direction transverse to the length of the strand and to cooperate respectively with a first and a second pivot secured to the lugs of the watch case, an elastic member arranged so as to move the first and second pads away from each other, and a lock arranged, on the one hand, to lock the fastening member when the lock is in a locked position and, on the other hand, to allow the fastening member to be disconnected from the watch case when the lock is actuated to be brought into an unlocked position and a force allowing the fastening member to be separated from the watch case is applied against the elastic member, wherein:

the lock and the first and second pads are configured so that the actuation of the lock from the locked position to the unlocked position does not transmit any movement to said first and second pads.

2. The fastening member of claim 1, wherein the lock comprises a body comprising a first portion accessible by the user and a second portion for blocking the displacement of the first and second pads when the lock (is in the locked position.

3. The fastening member of claim 2, wherein the lock is arranged to be returned to the locked position by an elastic member.

4. The fastening member of claim 3, wherein the lock comprises a recess, preferably cylindrical, inside which the elastic member, preferably a compression spring, is arranged in order to urge the lock into the locked position.

5. The fastening member of claim 3, further comprising a cover mounted on the housing, one end of the elastic member bearing against the cover.

6. The fastening member of claims 2, wherein the second portion of the body comprises a stop which prevents the pads from moving towards each other when the lock is in the locked position.

7. The fastening member claim 2, wherein the second portion comprises a notch which extends in a plane intercepting the direction of displacement of the lock, a part of each pad being configured to slide in the notch when the lock is in the unlocked position.

8. The fastening member of claim 1, comprising two side walls and a receiving part arranged on each side wall to receive the first and second pivots, the receiving parts being shaped to limit said disconnection to a relative movement exerted in a predefined direction.

9. The fastening member of claim 8, wherein each receiving part is arranged to receive one of the first and second pivots from an entry to an exit opening into the housing.

10. The fastening member of claim 1, wherein each pad comprises a first lateral side arranged opposite a corresponding side edge of the housing, and comprising a hole arranged to receive one end of the corresponding pivot when the fastening member is connected to the watch case.

11. The fastening member of claim 10, wherein the first lateral side further comprises a guiding surface leading to the hole, the guiding surface being profiled so as to induce a transverse displacement of each pad when the end of the corresponding pivot moves along said guiding surface.

12. The strand of a watch bracelet comprising the fastening member of claim 1.

13. The wristwatch comprising at least one strand of a watch bracelet of claim 12.

14. The method of disconnecting the fastening member of claim 1, comprising:

actuating the lock to bring it into the unlocked position, and applying a force to separate the fastening member from the watch case, while maintaining the lock in the unlocked position.

* * * * *